US005996615A

United States Patent [19]

Zuegner et al.

[11] Patent Number: 5,996,615

[45] Date of Patent: Dec. 7, 1999

[54] FLOW-CONTROL VALVE

[75] Inventors: Juergen Zuegner, Rieneck; Karl Cords, Partenstein; Hans Mueller, Marktheidenfeld; Michael Schulte, Frammersbach, all of Germany

[73] Assignee: Mannesmann Rexroth AG, Lohr, Germany

[21] Appl. No.: 09/051,857

[22] PCT Filed: Aug. 23, 1996

[86] PCT No.: PCT/EP96/03735

§ 371 Date: Jul. 14, 1998

§ 102(e) Date: Jul. 14, 1998

[87] PCT Pub. No.: WO97/15875

PCT Pub. Date: May 1, 1997

[30] Foreign Application Priority Data

Oct. 24, 1995 [DE] Germany ........................... 195 39 521

[51] Int. Cl.[6] ........................................................ G05D 7/01

[52] U.S. Cl. ............................................ 137/493; 137/501

[58] Field of Search .................................... 137/501, 504, 137/493

[56] References Cited

U.S. PATENT DOCUMENTS

| | | | |
|---|---|---|---|
| 3,015,341 | 1/1962 | Hedlund et al. | 137/493 |
| 3,145,730 | 8/1964 | Presnell | 137/504 |
| 3,424,196 | 1/1969 | Donner | 137/504 |
| 4,234,013 | 11/1980 | Rikuta . | |
| 4,237,922 | 12/1980 | Maier | 137/501 |
| 4,655,245 | 4/1987 | Gellerso | 137/121 |

FOREIGN PATENT DOCUMENTS

| | | |
|---|---|---|
| 30 13 084 A1 | 10/1981 | Germany . |
| 3013084 | 10/1981 | Germany . |
| 33 43 960 A1 | 6/1984 | Germany . |
| 3343960 | 6/1984 | Germany . |
| 41 36 991 A1 | 5/1993 | Germany . |

*Primary Examiner*—Stephen M. Hepperle

*Attorney, Agent, or Firm*—Oliff & Berridge, PLC

[57] ABSTRACT

Disclosed is a 2-way flow control valve whereby a constant hydraulic fluid volume flow may be adjusted by serial arrangement of a restrictor orifice and a control orifice. In the case of a reverse flow through the flow control valve of the present invention, a check actuating element of the flow control valve may be displaced against the bias of its own check spring in such a way that a bypass channel which bypasses the restrictor orifice can be controlled open.

14 Claims, 3 Drawing Sheets

FLOW-CONTROL VALVE

The invention concerns a flow control valve in accordance with the preamble of claim 1.

The like flow control valves are preferably utilized if, for example, cylinders and motors in a hydraulic system are to be supplied with different and variable load pressures with a respective pre-selected, constant volume flow. I.e., the flow control valve determines the useful flow flowing to the user, for instance the hydrocylinder or the hydromotor. Fundamentally there are three possibilities of arranging flow control valves in hydrosystems, wherein the arrangement may be provided in the supply toward the user (primary control), in the drain of the user (secondary control), or in a bypass conduit of the hydropump (bypass control).

In the known flow control valves, serial arrangement of a fixedly adjustable narrowing, i.e. a restrictor orifice and a pressure regulator comprising a valve slide (control orifice) which is controllable in dependence on the variable pressure conditions, serves to maintain a constant pressure difference at the restrictor orifice, so that a constant flow through the flow control valve may be adjusted.

In FIG. 1, which shall even now be referred to, a two-way flow control valve is shown, as for example described in Data Sheet J2A 60 “2-Wege-Stromregelventil” [2-way Flow Control Valve], p. J.07, J.08 by the applicant.

Such a known flow control valve 1 includes a valve housing 2 having an axial bore as a valve bore 4, which in turn communicates with an inlet port P and on the other hand is closed by a throttle member 6 mounted in an axially slidable manner in the valve bore, with adjustment of the axial position being effected via an actuating means 8 which is accessible in the axial direction from the outside. The throttle member 6 includes a throttle pin 10 which projects into a throttle bush 12 so that, through co-operation of the throttle pin 10 and the throttle bush 12, the effective sectional area of the restrictor orifice is adjustable by axial displacement of the throttle member 6. The throttle bush 12 is supported on a front surface of the valve bore 4 and in the range of the throttle pin 10 provided with radial bores 14 whereby a connection of the inlet port P to an outlaw port A is achieved.

At the end portion of the throttle bush 12 removed from the throttle pin 10, a control spring 16 is supported which in turn biases a valve slide 18 guided in an axially slidable manner in the valve bore 4, and by the end portion thereof which is removed from the spring side the opening cross-section of the outlet port A may be controlled open or closed. The valve slide 18 has an inner bore, so that the port P is connected to the outlet pore A via the inner bore of the valve slide, the throttle bush (restrictor orifice) 12, and the radial bores 14. In the case of a flow in the direction of the longitudinal axis of the valve, the fluid flows through the inner bore of the valve slide 18 and through the adjustable ring gap of the restrictor orifice toward the controlled outlet. As soon as a pressure difference corresponding to the spring rate is reached between the inlet port P and the controlled outlet port A, the valve slide 18 is displaced to the left in the representation according to FIG. 1 such as to throttle the volume flow to the controlled outlet port A, and thus the pressure difference at the restrictor orifice is maintained constant. Owing to this constant pressure drop over the restrictor orifice, the controlled discharge volume flow is also maintained constant independently of the pressure fluctuations at the inlet port P. As was mentioned earlier on, the valve slide is only capable of varying the cross-section of the outlet port once the spring force of the control spring 16 is overcome. I.e., when the pressure difference over the restrictor orifice is greater than the spring force divided by the effective valve slide area.

Such flow control valves also permit flow through them in the reverse direction, i.e. from port A to port P, and in this case have a check valve effect, with the pressure loss depending on the setting of the restrictor orifice (throttle pin 10, throttle bush 12) in the check function. I.e., upon use as a check valve, the control spring 16 acts as a check spring.

Use of such a flow control valve as a check valve has, however, shown that the check function only meets the requirements in few cases owing to the comparatively high spring rate of the control spring 16. More precisely, controlling the outlet port A closed only occurred in the presence of pressure differences between port P and the outlet of the restrictor orifice which were so high that use of the flow control valve was limited to only comparatively few cases of application.

DE-A1 33 43 960 discloses a flow control valve wherein a check actuating element is mounted at the outer circumference of the valve slide for controlling open radial bores of the valve slide in the check function, such that the restrictor orifice is bypassed.

In view thereof, the invention is based on the object of creating a flow control valve presenting improved function in the case of a reversed flow.

In view thereof, the invention is based on the object of creating a flow control valve presenting improved function in the case of a reversed flow.

This object is attained by the features of claim 1.

Owing to the measure of providing the flow control valve with a check actuating element whereby a bypass channel for bypassing the restrictor orifice may be controlled open, wherein movement of the check actuating element takes place in opposition against a check spring the spring rate rate of which may optimally be adapted to the pressure conditions prevailing during reverse flow, functionality of the flow control valve can be improved quite considerably in comparison with conventional solutions in the case of flow in the reverse direction. The spring rate of the check spring may herein be adapted to be lower than the spring rate of the control spring, so that on the one hand the function of the flow control valve in the “regular flow direction” may be optimised by suitable selection of the control spring, and on the other hand the function of the check actuating element upon reverse flow may be optimised by suitable selection of the check spring.

In the present case it is preferred if the valve slide constituting the control orifice has a bush-type structure such as to be flowed through along its inner bore, and is guided coaxially with respect to a restrictor orifice lining in the inner bore.

In a preferred embodiment, the check actuating element is formed by a check piston which is guided in the valve slide in an axially displaceable manner and which may be biased against a seat formed at the restrictor orifice through the check spring, so that the check piston can be raised from the restrictor orifice lining against the bias of the check spring, and the bypass channel can thus be controlled open. The effect of the check actuating element is in this case essentially determined by the pressure drop in the range of the seat at the restrictor orifice lining and by the spring rate of the check spring.

In this alternative it is preferred for the control spring to be supported at a front side which is removed from the restrictor orifice lining, preferably a radial shoulder of the check piston.

The control spring is preferably supported at the restrictor orifice-side end portion of the valve slide of the control orifice, so that structural space may be economised and a control spring having a comparatively large outer diameter may be employed.

In this embodiment, support of the control spring is preferably realised at an axial collar of the valve slide, which extends beyond the outlet port A and which is penetrated by axial bores whereby the spring cavity into which the restrictor orifice opens is connected to the outlet port A.

Supporting the check spring and the relative arrangement of the check piston in the direction toward the restrictor orifice lining is advantageously realized by the developments in accordance with appended claims 6 and 7.

In accordance with an alternative construction, the bypass channel is formed by radial bores of the restrictor orifice lining which can be controlled open by the valve slide against the bias of the check spring. In this embodiment the control spring is supported at a radial shoulder of the valve slide inner bore, i.e., the control spring is positioned within the valve slide. In this embodiment the valve slide also acts as a check actuating element.

Advantageously, supporting the control spring is achieved at the valve slide by intermediate arrangement of a support bush, the other end portion of which is supported at the valve housing, with the support bush advantageously extending through the check spring in the axial direction.

The outlet port of the flow control valve and the restrictor orifice outlet may be formed such as to hate a widening cross-section in accordance with subclaims 13 and 14.

Additional advantageous developments of the invention constitute the subject matters of the remaining appended claims.

Herebelow, preferred embodiments of the invention will be explained in more detail by referring to schematic drawings, wherein:

FIG. 2 shows a longitudinal sectional view of a first embodiment of a flow control valve 1 having the form of a Einbauventil.

For the sake of simplicity, analogous components shall in the following be designated by identical reference symbols as already allocated in the description of the prior art in FIG. 1.

Figure 1:
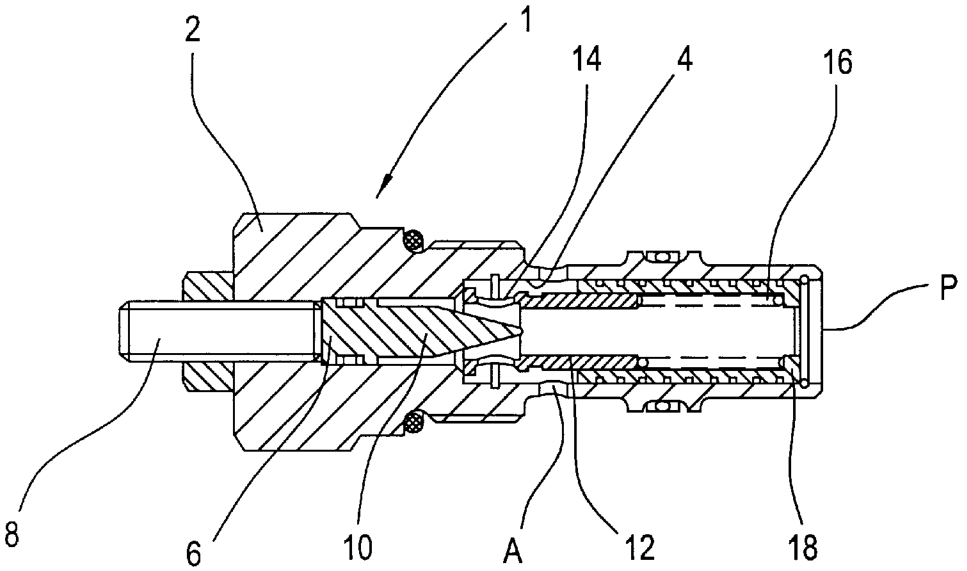
FIG. 1 shows a conventional flow control valve.

The flow control valve 1 includes a valve housing 2 which can be screwed into a valve block by means of a threaded portion. The right-hand termination of the flow control valve in the representation of FIG. 2 is formed by a terminal screw 20 wherein a through bore is formed as an inlet port P.

At an axial distance from the inlet port P an outlet port A is formed which, in the shown embodiment, is formed by two radial bore stars 21 and 22 arranged in series, of which the radical bore 21 has a smaller diameter than the radial bore 22. Between the two radial bores 21, 22 there remains a partition which is bridged via a connecting bore 24 in the valve housing 2; this connecting bore 24 is indicated by a broken line in FIG. 2.

Figure 2:
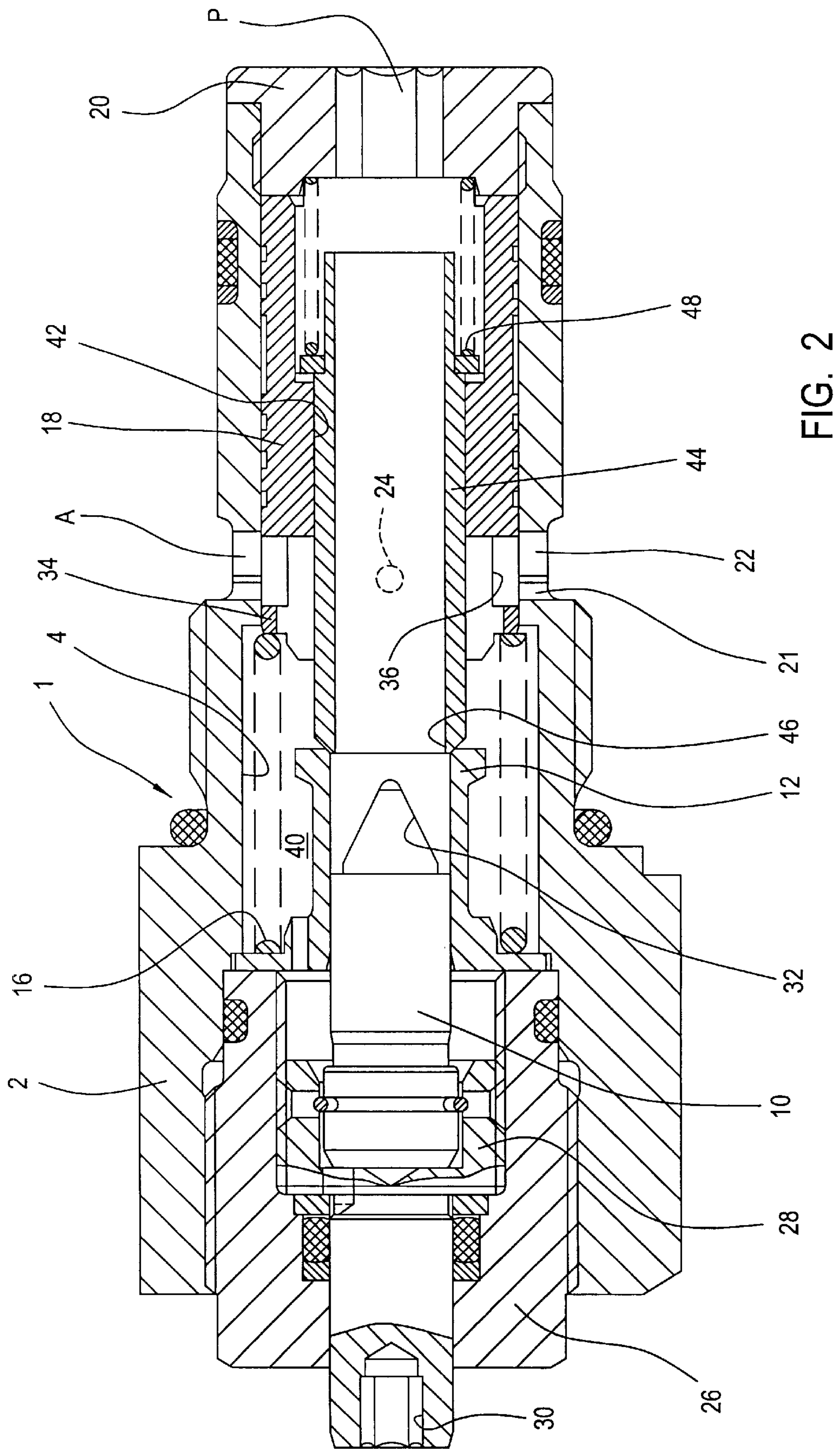
FIG. 2 shows a longitudinal sectional view of a first embodiment of a flow control valve in accordance with the invention.

The left-hand end portion of the valve bore 4 in the view of FIG. 2 is formed by a reducer 26 which is screwed into an end portion of the valve bore 4 which is radially widened and provided with a threaded portion. As a result of the reducer 26, the valve bore 4 is stepped back in the axial direction, with an internal thread portion of the reducers 26 being in threaded engagement with a spindle 28, the actuating portion 30 of which projects outwardly in an axial direction from the reducer 26 and is thus accessible to the operator.

Inside the spindle 28 a throttle pin 10 is rotatably mounted in a known manner, so that a displacement of the spindle 28 is converted into an axial displacement of the throttle pin 10. The throttle pin 10 plunges with its protruding end portion into an orifice or throttle bush 12 which is supported at the adjacent front surface of the reducer 26. In the peripheral wall of the restrictor orifice lining, at least one throttle opening 32 is formed which, in the shown embodiment, has the shape of a triangular window tapering in a direction away from the throttle pin 10.

By adjusting the spindle 28, and through the resulting axial displacement, it is possible to vary the cross-section of the throttle opening 32 and thus the effective sectional area of the restrictor orifice formed by the throttle pin 10 and the restrictor orifice lining 12 with the throttle opening 32.

The restrictor orifice lining 12 is clamped between the front surface of the reducer 26 and a bearing surface of the valve bore 4 having a radial shoulder. On the latter the control spring 16 is supported so as to encompass the restrictor orifice bush 12.

The other end portion of the control spring 16 contacts a valve slide 18, whereby the radial bores 21 and 22 and 24 of the outlet port A can be controlled open or closed.

In the shown home position, the end portion of the valve slide 18 which is removed from the control spring 16 contacts the terminal screw 20, so that the port bores 21 and 22 are controlled open. The valve slide 18 is provided with a contact collar 34 on which the control spring 16 acts. The outer diameter of the contact collar 34 is formed to be slightly smaller than the part of the valve slide 18 which is guided in the valve bore. At an axial distance from the contact collar 34 an annular groove 36 is formed which—in the home position shown in FIG. 2—is positioned approximately in the range of the radial bores 21, 22, and the width of which is e.g. adapted to the total width (representation of FIG. 2) of the two laterally adjacent radial bores 21, 22.

Figure 3:
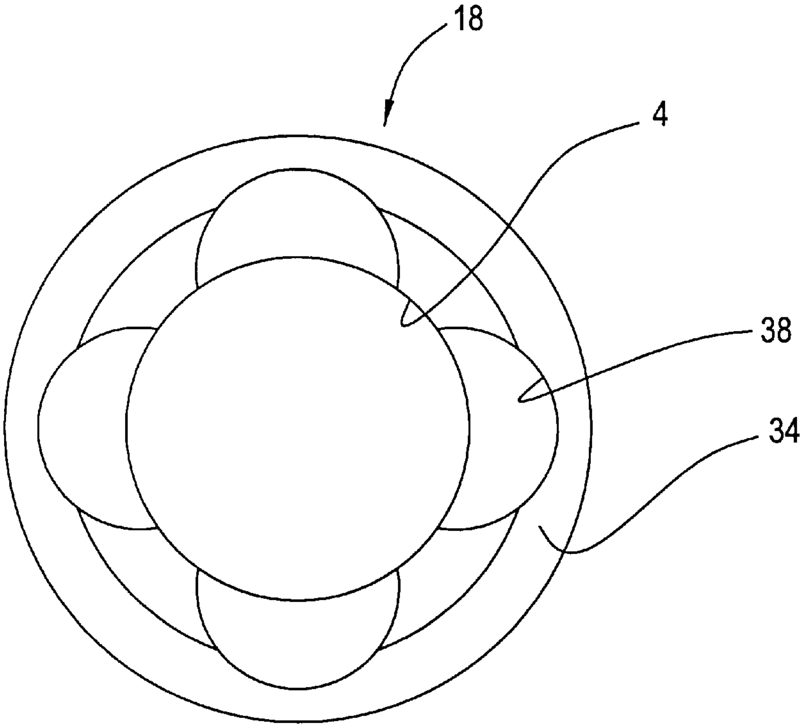
FIG. 3 shows a component of the flow control valve of FIG. 2.

FIG. 3 shows a front elevational view of the valve slide 18 when viewed from the control spring side. Accordingly, in the range of the contact collar 34 four axial bores 38 are provided which are located on a common portion of a circle, the diameter of which approximately corresponds to the diameter of the valve bore 4.

The axial bores 38 extend as far as the side wall of the right-hand annular groove 36 in the representation of FIG. 2, so that via the annular groove 36 and the axial bores 38 a connection of the spring cavity 40 with the outlet port A may be established.

Valve slide 18 and outlet port A thus act as a control orifice, whereby the pressure drop at the restrictor orifice 32 (throttle pin 10, restrictor orifice lining 12) can be controlled.

The bush-type valve slide 18 has an inner bore 42 in which a check piston 44 is guided which is also of the bush type and one end portion of which projects into the spring cavity 40 and can be taken into contact with a valve seat 46 of the restrictor orifice lining 12, so that the latter and the check piston 44 are arranged coaxially relative to each other. The check piston 44 is biased in the direction toward the valve seat 46 by a check spring 48. The check spring 48 rests on the one hand against a support ring fastened on the outer diameter of the check piston 44, and on the other hand against the terminal screw 20. For a better understanding, the function of the flow control valve shall now be described briefly.

Upon use as a flow control valve, i.e. upon flow from P to A, the hydraulic fluid enters into the flow control valve in an axial direction, flows through the check piston 44 located in its represented home position, and enters into the restrictor orifice. The effective cross-section thereof is predetermined by corresponding adjustment of the throttle pin 10, so that the hydraulic fluid flows through the throttle opening 32 and enters into the spring cavity 40. From here the hydraulic fluid passes from the axial bore 38 of the valve slide 18 via the annular groove 36 to the outlet port A.

In the case of such a flow through the flow control valve, the hydraulic fluid pressure acts on the front sides of the valve slide 18, so that in the case of a corresponding pressure drop within the flow control valve 1—more precisely: along the restrictor orifice (throttle pin 10, restrictor orifice lining 12 with throttle opening 32)—the valve slide 18 is raised from its contacting position at the terminal screw 20 against the bias of the control spring 16 and is displaced to the left in the axial direction (view of FIG. 2). Hereby the effective cross-section of the outlet port A is controlled closed until an equilibrium position of the valve slide 18 occurs. By means of the actuating movement of the valve slide 18, the pressure drop over the restrictor orifice is ensured to remain constant.

Thus far, the flow control valve 1 in accordance with the invention corresponds to a conventional flow control valve as represented in FIG. 1.

In the case of a reverse flow, i.e. from the outlet port A to the inlet port P, the fluid pressure at the port A acts on the seat-side end portion of the check piston 44, so that in the case of a corresponding pressure build-up at port A, the check piston 44 is raised from its seat 46 and the hydraulic fluid may flow directly from port A into the cavity of the check piston 44 and hence to the inlet port P while bypassing the restrictor orifice. The actuating movement of the check piston 44 is predetermined by the effective piston surface and the spring rate of the check spring 48, so that optimum adaptation to the operating conditions upon reverse flow is possible when these two values are adjusted correspondingly.

In normal operation, i.e. in the case of a flow from P to A, the check piston 44 is pressed against its seat 46 by the check spring 48 and by the fluid pressure, so that the bypass channel for bypassing the restrictor orifice is closed.

Figure 4:
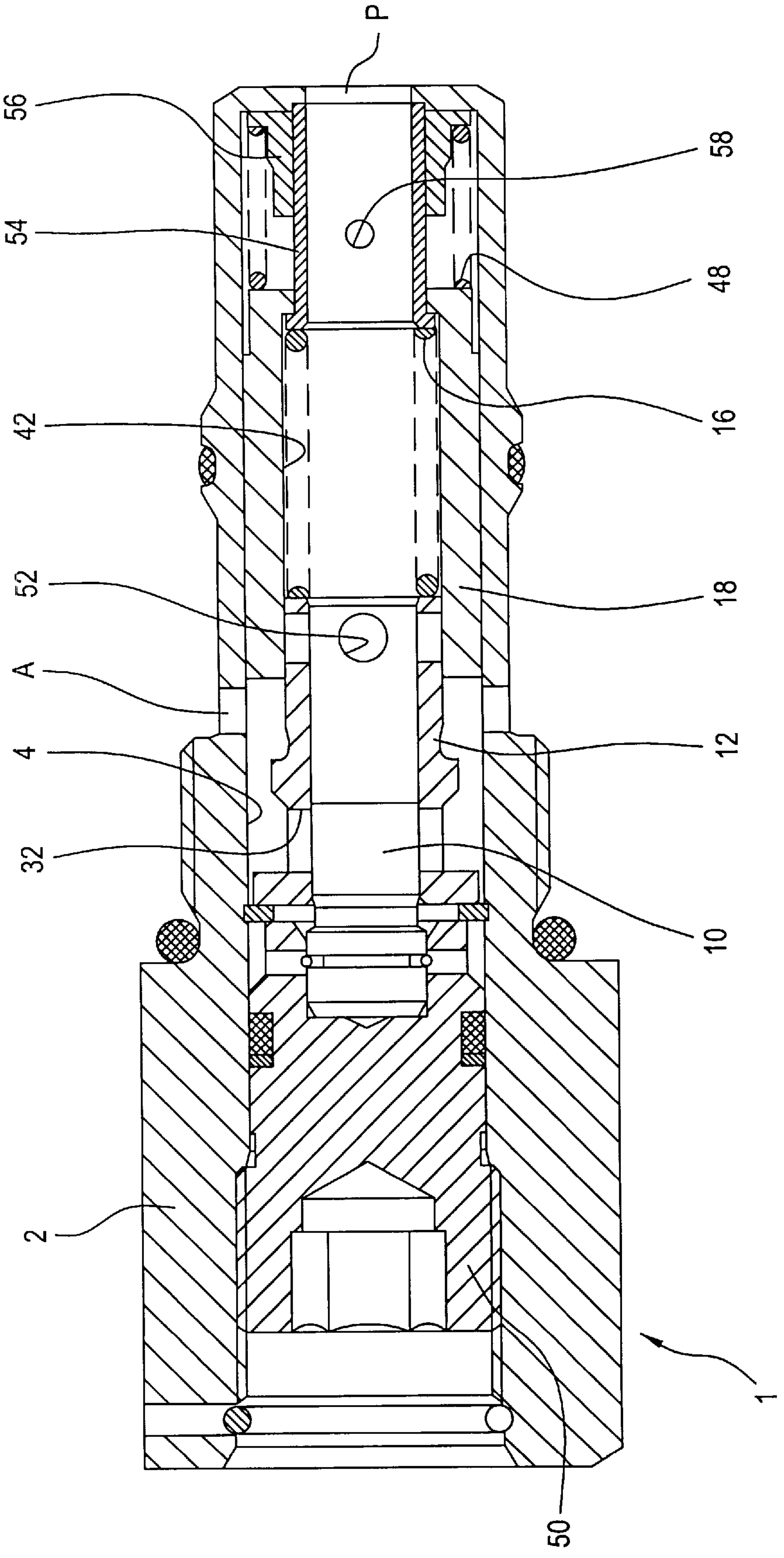
FIG. 4 shows a longitudinal sectional view of a second embodiment of a flow control valve in accordance with the invention.

In FIG. 4 another alternative of a flow control valve 1 in accordance with the invention is represented, however with no axially displaceable check piston 44 being provided.

In the valve housing 2 of this embodiment, a valve bore 4 extending in an axial direction is again formed, the left-hand end portion of which in the representation of FIG. 4 is provided with an internal thread engaged with the outer diameter of a spindle 50 which carries at its rearward end an actuating portion and whereby the valve bore 4 is blocked.

At the other end portion of the valve housing 2, the inlet port P is formed. The outlet port A, being a radial bore star of the valve housing 2, again communicates with the inner bore 4.

In the spindle 50 the throttle pin 10 is fixed rotatably, so that an axial displacement of the throttle pin 10 is effected by corresponding adjustment of the spindle 50. The protruding end portion of the throttle pin 10 plunges into the restrictor orifice lining 12 provided with radial bores 32 which may be controlled open or closed by the throttle pin.

The restrictor orifice lining 12 is supported at a support ring fastened in the valve bore 4 of the valve housing 2 and furthermore forming an axial stop for the spindle 50 (cf. representation of FIG. 4). In the shown home position, the radial bore 32 of the restrictor orifice lining 12, which acts as a throttle opening, is blocked or reduced to its minimum cross-section.

The one end portion of the restrictor orifice lining 12 removed from the spindle 50 plunges into the valve slide 18 which is guided in the valve bore 4 in an axially displaceable manner. In this end portion of the restrictor orifice lining 12, a radial bore star 52 is provided which, in the shown home position, is closed or abgedeckt by the inner peripheral wall of the valve slide 18.

By means of the control spring 16, the lining-type valve slide 18 is biased into its starting position in which the outlet port A is controlled fully open. The left-hand end portion of the control spring 16 in the representation of FIG. 4 is supported at the front side of the restrictor orifice lining 12, whereas the other end portion acts on a support bush 54 which is guided in a guide bush 56 such as to be axially displaceable, said bush 56 in turn being supported at the front side of the valve housing 2 in the axial direction. The one end portion of the support bush 54 which plunges into the inner bore 42 of the valve slide 18 is provided with a radial collar which forms a bearing surface for the control spring 16 and which may, via the one front surface thereof removed from the control spring 16, in turn be brought into contact with an inner front surface portion of the valve slide 18. The check spring 48 acts on the right-hand front surface of the valve slide 18 in the representation of FIG. 4, with the other end portion of the check spring 48 being supported at the guide bush 56 and thus at the valve housing 2.

Inside the support bush 54, one or several radial bores 58 are formed whereby the spring cavity of the check spring 48 is connected to the inside of the support bush 54, so that the pressure at the inlet port P acts on the right-hand front surface of the valve slide 18.

Upon use of this valve assembly as a flow control valve, i.e. upon flow from P to A, the hydraulic fluid passes through the support bush 54, the valve slide 18, and the restrictor orifice section formed by the restrictor orifice lining 12 and the throttle pin 10, toward the throttle opening 32 and from there to the outlet port A. When the pressure drop over the restrictor orifice rises to the predetermined limit, the control spring 16 is compressed so that the valve slide 18 is axially displaced to then left in the representation of FIG. 4, and the outlet port A is controlled closed. In this control movement the support bush 54 is drivingly engaged by the valve slide 18, so that the latter also performs an axial movement along the guide bush 56.

The axial displacement of the valve slide 18 in turn ensures the pressure drop over the restrictor orifice to remain constant.

Upon reverse flow through the flow control valve from port A to port P, the fluid pressure acting at the outlet port A acts on the adjacent front surface of the valve slide 18, so that the latter is supplied with a pressure that counteracts the spring force of the check spring 48. After the spring force 48 is overcome, the valve slide 18 is displaced toward the right in the representation of FIG. 4, bringing about a relative displacement of the valve slide 18 and of the support bush 54 which is supported at the front surface of the valve housing 2. Owing to the resulting axial displacement of the valve slide 18, the radial bore star 52 is controlled open, so that a bypass channel enabling bypassing the restrictor orifice is opened, so that the hydraulic fluid may flow directly from the outlet port A through the radial bore star 52, through the valve slide 18 and the support bush 54 to the inlet port P.

In the case of a pressure build-up from P to A, the valve slide 18 is in turn displaced toward the left, whereby the radial bore star 52 is controlled closed.

In this alternative, as well, the spring rate of the check spring 48 may in a simple manner be adapted to the operating conditions of reverse flow without requiring a modification of the control spring rate.

Both variations are characterized by simple structure at optimum adaptability to operating conditions.

What is claimed is:

1. A flow control valve including a restrictor orifice arranged between an inlet port (P) and an outlet port (A) of the flow control valve, and a valve slide guided in a valve bore whereby an opening cross-section toward the outlet port (A) may be controlled in an opening or closing direction in accordance with the pressure drop at the restrictor orifice and which is biased into its opening direction by a control spring, and with a check actuating element biased toward the closed position by means of a check spring, wherein a bypass channel for bypassing the restrictor orifice can be controlled open against the bias of the check spring via the check actuating element in the case of a reverse flow through the flow control valve, characterized in that the restrictor orifice is formed at a restrictor orifice bush which bush has a variable opening cross section and is located in the valve bore and that the bypass channel may be controlled open by cooperation of the restrictor orifice bush and the check actuating element.

2. The flow control valve according to claim 1, characterised in that a check piston enabling a flow through it is guided in an inner bore of the valve slide as a check actuating element and biased against a seat at the restrictor orifice entrance by means of the check spring, so that the bypass channel can be controlled open by raising the check piston from the seat in the case of a reverse flow.

3. The flow control valve according to claim 2, characterised in that the control spring is supported at a restrictor orifice-side front surface of the valve slide.

4. The flow control valve according to claim 2, characterised in that the valve slide includes a contact collar for the control spring, which extends beyond the outlet port and is penetrated by at least one axial bore connecting the outlet port to a spring cavity of the valve slide.

5. The flow control valve according to claim 2, characterised in that the seat is formed at the restrictor orifice bush.

6. The flow control valve according to claim 2, characterised in that the check spring is on the one hand supported at a front surface portion of the check piston which is removed from the restrictor orifice, and on the other hand at a terminal screw forming the inlet port (P).

7. A flow control valve including a restrictor orifice arranged between an inlet port (P) and an outlet port (A) of the flow control valve, and a valve slide guided in a valve bore whereby an opening cross-section toward the outlet port (A) may be controlled open or closed in accordance with the pressure drop at the restrictor orifice and which is biased into its opening direction by a control spring, and check means whereby a bypass channel for bypassing the restrictor orifice can be controlled open in the case of a reverse flow through the flow control valve, characterised in that the restrictor orifice is formed at a restrictor orifice bush which is fixed in the valve bore and has a variable opening cross-section, and that at the restrictor orifice bush a bypass opening of the bypass channel is formed which may be controlled open by displacement of the valve slide relative to the restrictor orifice bush.

8. The flow control valve according to claim 7, characterised in that the check spring acts on an outlet-port side front surface of the valve slide, and that the control spring is supported at a radial shoulder of the inner bore of the valve slide on the one hand, and on the other hand on a front surface of the restrictor orifice bush, one end portion of which plunges into the inner bore.

9. The flow control valve according to claim 7, characterised in that the end portion of the restrictor orifice bush is provided with at least one radial bore which can be controlled open as a by-pass channel through an axial displacement of the valve slide.

10. The flow control valve according to claim 7, characterised in that the control spring is supported at the front surface of the valve slide by means of a support bush, one end portion of which is supportable at the valve housing, and the other end portion of which plunges into the inner bore and includes a radial shoulder which is biased against an internal shoulder of the valve slide by means of the control spring.

11. The flow control valve according to claim 7, characterised in that the check spring is arranged coaxially with the support bush.

12. The flow control valve according to claim 1, characterised in that the outlet port (A) is formed to have a widening sectional area, preferably by two radial bore stars spaced apart from each other.

13. The flow control valve according to claim 1, characterised in that a throttle opening of the restrictor orifice has the form of a triangular window.

14. The flow control valve according to claim 1, characterised in that the inlet port (A) is connected to the restrictor orifice through the inner bore, and in that the valve slide is guided coaxially with a restrictor orifice bush.

* * * * *